US012287772B2

(12) United States Patent
Liu et al.

(10) Patent No.: US 12,287,772 B2
(45) Date of Patent: Apr. 29, 2025

(54) MAP UPDATE DATA PROCESSING METHOD, APPARATUS, AND SYSTEM

(71) Applicant: Shenzhen Yinwang Intelligent Technologies Co., Ltd., Shenzhen (CN)

(72) Inventors: Jianqin Liu, Shenzhen (CN); Yong Wu, Beijing (CN); Wei Zhou, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 106 days.

(21) Appl. No.: 18/069,786

(22) Filed: Dec. 21, 2022

(65) Prior Publication Data

US 2023/0119940 A1    Apr. 20, 2023

Related U.S. Application Data

(63) Continuation of application No. PCT/CN2020/098243, filed on Jun. 24, 2020.

(51) Int. Cl.
*G06F 16/23* (2019.01)
*G01C 21/00* (2006.01)
*G06F 16/29* (2019.01)

(52) U.S. Cl.
CPC ..... *G06F 16/2365* (2019.01); *G01C 21/3841* (2020.08); *G01C 21/3893* (2020.08); *G01C 21/3896* (2020.08); *G06F 16/2358* (2019.01); *G06F 16/29* (2019.01)

(58) Field of Classification Search
CPC .. G06F 16/23; G06F 16/2358; G06F 16/2365; G06F 16/29; G01C 21/3815; G01C 21/3841; G01C 21/3893; G01C 21/3896; H04L 67/10; H04L 67/12; H04W 4/024; H04W 4/38; H04W 4/44
USPC .......................................................... 701/450
See application file for complete search history.

(56) References Cited

U.S. PATENT DOCUMENTS

| | | | | |
|---|---|---|---|---|
| 7,912,628 | B2 * | 3/2011 | Chapman | G08G 1/0141 701/117 |
| 8,884,782 | B2 * | 11/2014 | Rubin | H04W 74/0816 340/436 |
| 9,127,952 | B2 * | 9/2015 | Basnayake | G01C 21/165 |
| 9,310,804 | B1 * | 4/2016 | Ferguson | G05D 1/0246 |
| 9,828,001 | B2 * | 11/2017 | Kusano | G07C 5/0808 |

(Continued)

FOREIGN PATENT DOCUMENTS

| | | |
|---|---|---|
| CN | 110832474 A | 2/2020 |
| DE | 102018204500 A1 | 9/2019 |

(Continued)

*Primary Examiner* — Atul Trivedi
(74) *Attorney, Agent, or Firm* — Leydig, Voit & Mayer, Ltd.

(57) ABSTRACT

A map update data processing apparatus and method are provided. The method includes: obtaining first information from at least one vehicle terminal in a time window; determining, based on the first information and second information in a map, first change information of the second information and precision information and/or confidence information of the first change information, wherein the first change information indicates a difference between the first information and the second information; and finally, sending the first change information of the second information and the precision information and/or the confidence information to a first vehicle terminal.

20 Claims, 7 Drawing Sheets

(56) References Cited

U.S. PATENT DOCUMENTS

| | | | |
|---|---|---|---|
| 9,855,894 B1* | 1/2018 | Khorasani | B60K 35/22 |
| 9,908,464 B2* | 3/2018 | Caveney | B60Q 9/00 |
| 10,223,380 B2* | 3/2019 | Giurgiu | H04L 67/12 |
| 10,317,240 B1* | 6/2019 | Di Pietro | G01C 21/3694 |
| 10,346,372 B2* | 7/2019 | van der Laan | H04W 4/02 |
| 10,657,804 B2* | 5/2020 | Giurgiu | G08G 1/0112 |
| 10,678,259 B1* | 6/2020 | Ferguson | G06T 7/74 |
| 11,132,780 B2* | 9/2021 | Xie | G01S 17/06 |
| 11,385,656 B2* | 7/2022 | Garcia | G05D 1/0274 |
| 11,527,084 B2* | 12/2022 | Taghavi | G06V 10/25 |
| 2014/0222277 A1* | 8/2014 | Tsimhoni | G01C 21/3697 701/23 |
| 2016/0259814 A1 | 9/2016 | Mizoguchi | |
| 2018/0188026 A1* | 7/2018 | Zhang | G01C 21/3635 |
| 2018/0188037 A1* | 7/2018 | Wheeler | G06V 20/582 |
| 2018/0196439 A1* | 7/2018 | Levinson | B60W 60/0027 |
| 2019/0041497 A1* | 2/2019 | Smith | G01S 13/931 |
| 2019/0051153 A1* | 2/2019 | Giurgiu | G01C 21/3691 |
| 2019/0051172 A1* | 2/2019 | Stenneth | G08G 1/163 |
| 2019/0325738 A1* | 10/2019 | Dorum | G08G 1/0129 |
| 2019/0325739 A1* | 10/2019 | Dorum | G01S 19/51 |
| 2019/0376795 A1* | 12/2019 | Linder | H04W 4/40 |
| 2020/0114933 A1* | 4/2020 | Ono | B60K 35/28 |
| 2020/0124434 A1* | 4/2020 | Marzorati | G01C 21/3423 |
| 2020/0175286 A1* | 6/2020 | Major | G06V 10/82 |
| 2020/0309536 A1* | 10/2020 | Omari | G07C 5/008 |
| 2020/0372012 A1* | 11/2020 | Averbuch | G06F 16/2379 |
| 2020/0393261 A1* | 12/2020 | Zhang | G08G 1/0141 |
| 2021/0004363 A1* | 1/2021 | Bailly | G06T 17/05 |
| 2021/0233390 A1* | 7/2021 | Georgiou | G08G 1/0133 |
| 2021/0406559 A1* | 12/2021 | Efland | G01C 21/3878 |
| 2022/0172616 A1* | 6/2022 | Xu | G01C 21/3691 |
| 2022/0188581 A1* | 6/2022 | Kaku | G01C 21/3848 |
| 2022/0333950 A1* | 10/2022 | Akbarzadeh | G08G 1/0129 |
| 2023/0131885 A1* | 4/2023 | Wang | G01C 21/3804 701/450 |
| 2024/0035834 A1* | 2/2024 | Beaurepaire | G01C 21/3807 |
| 2024/0159563 A1* | 5/2024 | Fei | G01C 21/3811 |
| 2024/0183682 A1* | 6/2024 | Stenneth | G06N 20/00 |
| 2024/0244410 A1* | 7/2024 | Fei | H04W 4/021 |

FOREIGN PATENT DOCUMENTS

| | | | | |
|---|---|---|---|---|
| EP | 3674657 A1 | * | 7/2020 | G01C 11/00 |
| JP | 2004205344 A | | 7/2004 | |
| JP | 2009281852 A | | 12/2009 | |
| JP | 2018018284 A | | 2/2018 | |
| JP | 2019200132 A | | 11/2019 | |
| KR | 20200016949 A | * | 2/2020 | B60W 60/0015 |
| WO | WO-2019109082 A1 | * | 6/2019 | G01C 21/165 |

* cited by examiner

MAP UPDATE DATA PROCESSING METHOD, APPARATUS, AND SYSTEM

CROSS-REFERENCE TO RELATED APPLICATIONS

This application is a continuation of International Application No. PCT/CN2020/098243, filed on Jun. 24, 2020, the disclosure of which is hereby incorporated by reference in its entirety.

TECHNICAL FIELD

Embodiments of this application relate to the field of autonomous driving technologies, and in particular, to a map update data processing method, apparatus, and system.

BACKGROUND

An autonomous vehicle relies on collaboration of technologies such as artificial intelligence, visual computing, radar, a positioning system, and a high definition map, so that a computer can automatically and safely operate a motor vehicle without any active manual operation. The high definition map is used as a mandatory tool for vehicle navigation, and accuracy, precision, and update efficiency of the high definition map are crucial to safety of the autonomous vehicle. For example, the map needs to be updated when a road is closed, a route changes, or a traffic sign changes.

In an existing high definition map update solution, a sensor of a vehicle terminal is used to detect an ambient environment, and a detection result (for example, feature information of a road) corresponding to a detected target is compared with a local map. If it is determined that the detection result corresponding to the target does not match a corresponding map element in the local map, the detection result corresponding to the target is sent to a cloud server, and the cloud server updates the map based on the detection result, and sends the updated map to the vehicle terminal.

However, because performance and the like of sensors of different vehicle terminals are different, precision of map elements collected by different vehicle terminals is not completely consistent, and sensor statuses of different vehicle terminals are unstable, in the foregoing method, reliability of map update data received by the vehicle terminal is uncertain. If the vehicle terminal performs navigation by using the map update data, security cannot be ensured.

SUMMARY

This application provides a map update data processing method, apparatus, and system used for a smart vehicle, to improve reliability of map update data sent to a vehicle terminal, and further ensure security of using the map update data by the vehicle terminal.

According to a first aspect, this application provides a map update data processing method, and the method includes: A computing apparatus first obtains first information from at least one vehicle terminal in a time window. The first information does not match corresponding second information in a local map stored in the vehicle terminal. Then, the computing apparatus determines, based on the first information, first change information of the second information and precision information and/or confidence information corresponding to the first change information. The first change information is information about a difference between the first information and the second information. Finally, the computing apparatus sends the first change information of the second information and the precision information and/or the confidence information corresponding to the first change information to the at least one vehicle terminal. The precision information and/or the confidence information corresponding to the first change information is used by the vehicle terminal to determine whether to use the first change information of the second information. Because the map update data sent by the computing apparatus to the vehicle terminal carries the precision information and/or the confidence information, and the precision information and/or the confidence information may represent accuracy and reliability of the map update data, the vehicle terminal may learn credibility of the map update data, and may further determine, based on the reliability, whether to use the map update data. This improves reliability of using the map update data sent to the vehicle terminal, and ensures security of using the map update data by the vehicle terminal.

In a possible design, the second information includes one or more of the following parameters: at least one map element in the local map, at least one map element group in the local map, at least one map tile in the local map, at least one region in the local map, and at least one country in the local map.

In a possible design, the method in this implementation may further include: The computing apparatus receives, from the at least one vehicle terminal, result feedback information obtained after the first change information is used. The computing apparatus determines second change information of the second information based on the result feedback information. The second change information of the second information is data used to perform map update. The vehicle terminal may use the first change information of the second information to check accuracy of a map element in updated map information, and notify the computing apparatus of a check result. The computing apparatus may determine, based on the result feedback information, whether the second change information of the second information includes the first change information. This further improves accuracy and credibility of the map update data.

In a possible design, the precision information corresponding to the first change information is a quantity of vehicle terminals that report the first information in a time window. Correspondingly, the computing apparatus may determine, based on the quantity of vehicle terminals that report the first information in a time window, that the precision information corresponding to the first change information is the quantity of vehicle terminals that report the first information in the time window.

Alternatively, the precision information corresponding to the first change information is a ratio of a quantity of vehicle terminals that report the first information in a time window to a quantity of all vehicle terminals that pass through a geographical location corresponding to the second information in a time window. Correspondingly, the computing apparatus may determine, based on the quantity of vehicle terminals that report the first information in a time window and the quantity of all vehicle terminals that pass through a geographical location corresponding to the second information in a time window, the precision information corresponding to the first change information.

Alternatively, the precision information corresponding to the first change information is error information of the first change information. Correspondingly, the computing apparatus may determine, based on the error information of the first change information, the precision information corresponding to the first change information.

In a possible design, the confidence information corresponding to the first change information is a maximum value or a weighted average value of a confidence level of the first change information in the time window.

In a possible design, when a quantity of map elements corresponding to the second information is greater than 1, the confidence information corresponding to the first change information is an average value of confidence levels of all map elements corresponding to the second information.

In a possible design, if a transmission delay of the first information is greater than or equal to a preset threshold, the computing apparatus is a cloud server.

That a computing apparatus obtains first information from at least one vehicle terminal in a time window may be specifically:

The computing apparatus receives the first information sent by the at least one vehicle terminal.

Alternatively, the computing apparatus receives the first information sent by the at least one vehicle terminal through a first device.

In a possible design, before the computing apparatus receives the first information sent by the at least one vehicle terminal through the first device, the method further includes:

The computing apparatus sends, to the first device, information used to request the first information.

In a possible design, if a transmission delay of the first information is less than a preset threshold, the computing apparatus is a second device.

That a computing apparatus obtains first information from at least one vehicle terminal in a time window may be:

The computing apparatus receives the first information sent by the at least one vehicle terminal. Specifically, the vehicle terminal directly transmits the first information to the second device, and the second device processes the first information. In this way, a transmission delay is relatively short, and an overall processing time can be shortened.

In a possible design, the second device is one of a base station, a roadside unit device, or another vehicle terminal except the at least one vehicle terminal.

In a possible design, the first information is scrambled by using vehicle identification information, area identification information, or map element identification information. In this way, first information sent by different vehicle terminals can be distinguished, and accuracy of demodulation of received information from different vehicles can be improved.

Alternatively, the first information is initialized by using vehicle identification information, area identification information, or map element identification information. In this way, first information sent by different vehicle terminals can be distinguished, and accuracy of demodulation of received information from different vehicles can be improved.

In a possible design, if a transmission delay of the first information is less than a preset threshold, the computing apparatus is a cloud server, and an amount of first information whose transmission delay is less than the preset threshold is less than or equal to an amount of first information whose transmission delay is greater than or equal to the preset threshold. In this way, complexity of data processing by the computing apparatus can be reduced.

According to a second aspect, this application provides a map update data processing method, and the method includes:

A vehicle terminal sends first information to a computing apparatus. The first information does not match corresponding second information in a local map stored in the vehicle terminal. The first information is used by the computing apparatus to determine first change information of the second information and precision information and/or confidence information corresponding to the first change information. The first change information is information about a difference between the first information and the second information. Then, the vehicle terminal receives the first change information of the second information and the precision information and/or the confidence information corresponding to the first change information from the computing apparatus. Finally, the vehicle terminal determines, based on the precision information and/or the confidence information corresponding to the first change information, whether to use the first change information of the second information. Because the map update data received by the vehicle terminal carries the precision information and/or the confidence information, and the precision information and/or the confidence information may represent accuracy and reliability of the map update data, the vehicle terminal may learn credibility of the map update data, and may further determine, based on the reliability, whether to use the map update data. This improves reliability of using the map update data received by the vehicle terminal, and ensures security of using the map update data by the vehicle terminal.

In a possible design, the second information may include one or more of the following parameters:

at least one map element in the local map, at least one map element group in the local map, at least one map tile in the local map, at least one region in the local map, and at least one country in the local map.

In a possible design, the method may further include:

The vehicle terminal sends, to the computing apparatus, result feedback information obtained after the first change information is used. The vehicle terminal may use the first change information of the second information to check accuracy of a map element in updated map information, and notify the computing apparatus of a check result. The computing apparatus may determine, based on the result feedback information, whether the second change information of the second information includes the first change information. This further improves accuracy and credibility of the map update data.

In a possible design, the precision information corresponding to the first change information is a quantity of vehicle terminals that report the first information in a time window.

Alternatively, the precision information corresponding to the first change information is a ratio of a quantity of vehicle terminals that report the first information in a time window to a quantity of all vehicle terminals that pass through a geographical location corresponding to the second information in a time window.

Alternatively, the precision information corresponding to the first change information is error information of the first change information.

In a possible design, the confidence information corresponding to the first change information is a maximum value or a weighted average value of a confidence level of the first change information in the time window.

In a possible design, when a quantity of map elements corresponding to the second information is greater than 1, the confidence information corresponding to the first change information is an average value of confidence levels of all map elements corresponding to the second information.

In a possible design, the first information is scrambled by using vehicle identification information, area identification information, or map element identification information. In this way, first information sent by different vehicle terminals can be distinguished, and accuracy of demodulation of received information from different vehicles can be improved.

Alternatively, the first information is initialized by using vehicle identification information, area identification information, or map element identification information. In this way, first information sent by different vehicle terminals can be distinguished, and accuracy of demodulation of received information from different vehicles can be improved.

According to a third aspect, this application provides a map update data processing apparatus, and the apparatus includes: an obtaining module, configured to obtain first information from at least one vehicle terminal in a time window, where the first information does not match corresponding second information in a local map stored in the vehicle terminal; a determining module, configured to determine, based on the first information, first change information of the second information and precision information and/or confidence information corresponding to the first change information, where the first change information is information about a difference between the first information and the second information; and a sending module, configured to send the first change information of the second information and the precision information and/or the confidence information corresponding to the first change information to the at least one vehicle terminal, where the precision information and/or the confidence information corresponding to the first change information is used by the vehicle terminal to determine whether to use the first change information of the second information.

In a possible design, the second information includes one or more of the following parameters:

at least one map element in the local map, at least one map element group in the local map, at least one map tile in the local map, at least one region in the local map, and at least one country in the local map.

In a possible design, the apparatus further includes:

a receiving module, configured to receive, from the at least one vehicle terminal, result feedback information obtained after the first change information is used.

The determining module is further configured to determine second change information of the second information based on the result feedback information. The second change information of the second information is data used to perform map update.

In a possible design, the precision information corresponding to the first change information is a quantity of vehicle terminals that report the first information in a time window.

Alternatively, the precision information corresponding to the first change information is a ratio of a quantity of vehicle terminals that report the first information in a time window to a quantity of all vehicle terminals that pass through a geographical location corresponding to the second information in a time window.

Alternatively, the precision information corresponding to the first change information is error information of the first change information.

In a possible design, the confidence information corresponding to the first change information is a maximum value or a weighted average value of a confidence level of the first change information in the time window.

In a possible design, when a quantity of map elements corresponding to the second information is greater than 1, the confidence information corresponding to the first change information is an average value of confidence levels of all map elements corresponding to the second information.

In a possible design, if a transmission delay of the first information is greater than or equal to a preset threshold, the apparatus includes a cloud server.

The obtaining module is specifically configured to: receive the first information sent by the at least one vehicle terminal; or receive the first information sent by the at least one vehicle terminal through a first device.

In a possible design, the sending module is further configured to:

before the obtaining module receives the first information sent by the at least one vehicle terminal through the first device, send, to the first device, information used to request the first information.

In a possible design, if a transmission delay of the first information is less than a preset threshold, the apparatus includes a second device.

The obtaining module is specifically configured to: receive the first information sent by the at least one vehicle terminal.

In a possible design, the second device includes one of a base station, a roadside unit device, or another vehicle terminal except the at least one vehicle terminal.

In a possible design, the first information is scrambled by using vehicle identification information, area identification information, or map element identification information.

Alternatively, the first information is initialized by using vehicle identification information, area identification information, or map element identification information.

In a possible design, if a transmission delay of the first information is less than a preset threshold, the apparatus includes a cloud computing apparatus, and an amount of first information whose transmission delay is less than the preset threshold is less than or equal to an amount of first information whose transmission delay is greater than or equal to the preset threshold.

For beneficial effects of the map update data processing apparatus according to any one of the third aspect and the possible designs of the third aspect, refer to the beneficial effects brought by any one of the first aspect and the possible implementations of the first aspect, and details are not described herein again.

According to a fourth aspect, this application provides a vehicle terminal, and the vehicle terminal includes:

a sending module, configured to send first information to a computing apparatus, where the first information does not match corresponding second information in a local map stored in the vehicle terminal, the first information is used by the computing apparatus to determine first change information of the second information and precision information and/or confidence information corresponding to the first change information, and the first change information is information about a difference between the first information and the second information;

a receiving module, configured to receive the first change information of the second information and the precision information and/or the confidence information corresponding to the first change information from the computing apparatus; and a determining module, configured to determine, based on the precision information and/or the confidence information corresponding to the first change information, whether to use the first change information of the second information.

In a possible design, the second information includes one or more of the following parameters:

at least one map element in the local map, at least one map element group in the local map, at least one map tile in the local map, at least one region in the local map, and at least one country in the local map.

In a possible design, the sending module is further configured to:

send, to the computing apparatus, result feedback information obtained after the first change information is used.

In a possible design, the precision information corresponding to the first change information is a quantity of vehicle terminals that report the first information in a time window.

Alternatively, the precision information corresponding to the first change information is a ratio of a quantity of vehicle terminals that report the first information in a time window to a quantity of all vehicle terminals that pass through a geographical location corresponding to the second information in a time window.

Alternatively, the precision information corresponding to the first change information is error information of the first change information.

In a possible design, the confidence information corresponding to the first change information is a maximum value or a weighted average value of a confidence level of the first change information in the time window.

In a possible design, when a quantity of map elements corresponding to the second information is greater than 1, the confidence information corresponding to the first change information is an average value of confidence levels of all map elements corresponding to the second information.

In a possible design, the first information is scrambled by using vehicle identification information, area identification information, or map element identification information.

Alternatively, the first information is initialized by using vehicle identification information, area identification information, or map element identification information.

For beneficial effects of the map update data processing apparatus according to any one of the fourth aspect and the possible designs of the fourth aspect, refer to the beneficial effects brought by any one of the second aspect and the possible implementations of the second aspect, and details are not described herein again.

According to a fifth aspect, this application provides a map update data processing apparatus, and the apparatus includes a memory and a processor.

The memory is configured to store program instructions.

The processor is configured to invoke the program instructions in the memory to perform the map update data processing method according to any one of the first aspect and the possible designs of the first aspect.

According to a fifth aspect, this application provides a vehicle terminal, and the vehicle terminal includes a memory and a processor.

The memory is configured to store program instructions.

The processor is configured to invoke the program instructions in the memory to perform the map update data processing method according to any one of the second aspect and the possible designs of the second aspect.

According to a sixth aspect, this application provides a readable storage medium. The readable storage medium stores execution instructions. When at least one processor of a map update data processing apparatus executes the execution instructions, the map update data processing apparatus performs the method according to any one of the first aspect and the possible designs of the first aspect.

According to a seventh aspect, this application provides a readable storage medium. The readable storage medium stores execution instructions. When at least one processor of a vehicle terminal executes the execution instructions, the vehicle terminal performs the method according to any one of the second aspect and the possible designs of the second aspect.

According to an eighth aspect, this application provides a map update data processing system. The map update data processing system includes the map update data processing apparatus according to any one of the third aspect and the possible designs of the third aspect and the vehicle terminal according to any one of the fourth aspect and possible designs of the fourth aspect.

DESCRIPTION OF EMBODIMENTS

In embodiments of this application, a word such as "example" or "for example" is used to give an example, an illustration, or descriptions. Any embodiment or scheme described as "example" or "for example" in the embodiments of this application should not be explained as being more preferred or having more advantages than another embodiment or scheme. Exactly, use of the word "example" or "for example" is intended to present a relative concept in a specific manner. Terms "first" and "second" are merely used for a purpose of description, and shall not be understood as an indication or implication of relative importance.

In the conventional technology, because reliability of map update data received by a vehicle terminal is uncertain, if the vehicle terminal performs navigation by using the map update data, security cannot be ensured.

To resolve this problem, this application provides a map update data processing method, apparatus, and system. A computing apparatus determines map update data and precision information and/or confidence information of the map update data based on data collected by a vehicle terminal. Then, the map update data and the precision information and/or the confidence information of the map update data are sent to the vehicle terminal. Because the map update data sent by the computing apparatus to the vehicle terminal carries the precision information and/or the confidence information, and the precision information and/or the confidence information may represent reliability of the map update data, the vehicle terminal may learn credibility of the map update data, and may further determine, based on the reliability, whether to use the map update data. This improves reliability of using the map update data sent to the vehicle terminal, and ensures security of using the map update data by the vehicle terminal. The following describes in detail the map update data processing method, apparatus, and system provided in this application with reference to the accompanying drawings.

The map update data processing method, apparatus, and system provided in this application may be applied to an unmanned driving, an assisted driving (driver assistance/ ADAS), or an intelligent driving field.

The map update data processing method provided in this application may be performed by a computing apparatus. The computing apparatus may be a server, or may be an apparatus such as a processor disposed in the server. The server may be a cloud server, or the like.

Figure 1:
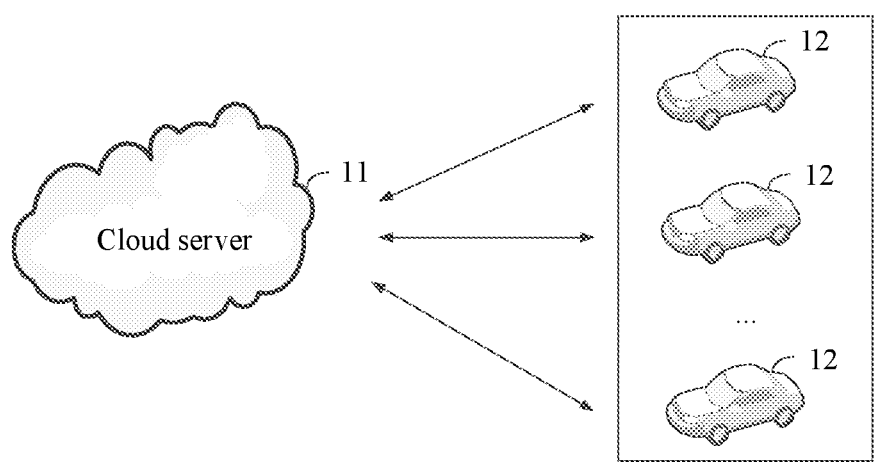
FIG. 1 is a schematic diagram of a scenario to which a map update data processing method is applied according to this application.

FIG. 1 is a schematic diagram of a scenario to which the map update data processing method is applied according to this application. As shown in FIG. 1, in this application scenario, a cloud server 11 and a vehicle terminal 12 are mainly involved. The vehicle terminal 12 uses a local map, and may sense an ambient environment. For example, the vehicle terminal 12 may sense the ambient environment through a sensor disposed on the vehicle terminal 12, and detect first information. The vehicle terminal 12 compares the detected first information with corresponding second information in the local map, and if the detected first information does not match the corresponding second information, sends the detected first information to the cloud server. The cloud server 11 may store a high definition map database. The cloud server 11 may receive at least one piece of first information from the vehicle terminal 12; determine, based on received first information from at least one vehicle terminal in a time window, first change information of the second information and precision information and/or confidence information corresponding to the first change information, where the first change information is information about a difference between the first information and the second information, or information indicating that the first information is inconsistent with the second information; and then send the first change information of the second information and the precision information and/or the confidence information corresponding to the first change information to the vehicle terminal 12 and another vehicle terminal. The vehicle terminal 12 or the another vehicle terminal may determine, based on the precision information and/or the confidence information corresponding to the first change information, whether to use the first change information. For example, if the vehicle terminal determines that the precision information and/or the confidence information corresponding to the first change information meets a preset requirement, the first change information is used. For example, navigation may be performed directly by using the first change information, or navigation may be performed after the local map is updated by using the first change information. After using the first change information, the vehicle terminal 12 sends, to the cloud server 11, result feedback information obtained after the first change information is used. The result feedback information is a vehicle running result after the first change information is used. The cloud server 11 determines second change information of the second information based on the result feedback information after the first change information is used.

Figure 2:
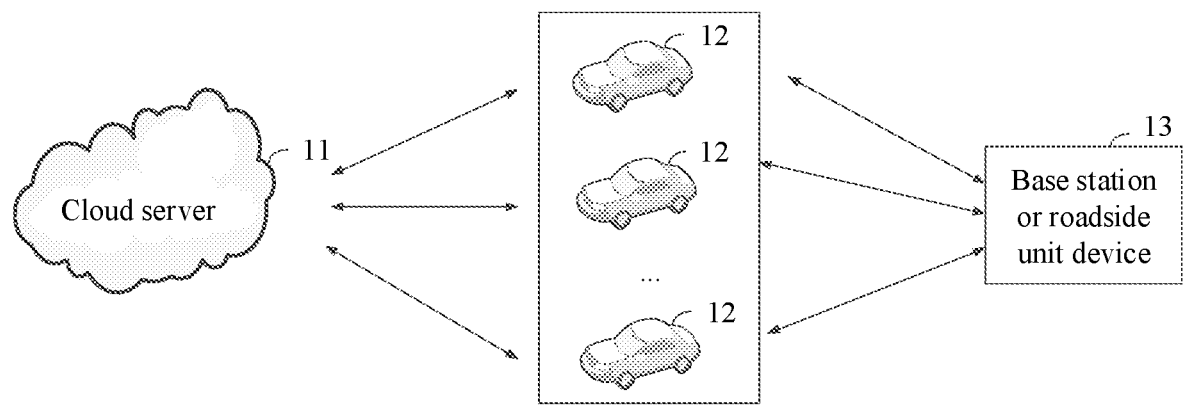
FIG. 2 is a schematic diagram of another scenario to which a map update data processing method is applied according to this application.

FIG. 2 is a schematic diagram of another scenario to which the map update data processing method is applied according to this application. As shown in FIG. 2, in this application scenario, a cloud server 11, a vehicle terminal 12, and a base station or roadside unit device 13 are mainly involved. The vehicle terminal 12 uses a local map. In addition, the vehicle terminal 12 may sense an ambient environment. For example, the vehicle terminal 12 may sense the ambient environment through a sensor disposed on the vehicle terminal 12, and detect first information. The vehicle terminal 12 compares the detected first information with corresponding second information in the local map. If the detected first information does not match the corresponding second information, a transmission delay of the first information is first determined. If the transmission delay of the first information is greater than or equal to a preset threshold, the first information is delay-insensitive information. In this case, the vehicle terminal 12 sends the first information to the cloud server 11 directly or through a first device. The cloud server 11 performs processing. Specifically, the cloud server 11 performs processing by using the map update data processing method provided in this application. If the transmission delay of the first information is less than the preset threshold, that is, the first information is delay-sensitive information, real-time information, and information that needs to be processed in a short time, the vehicle terminal 12 sends the first information to a second device 13. The second device 13 performs processing. Specifically, the second device 13 performs processing by using the map update data processing method provided in this application. The first device may be a base station, a roadside unit device, or another vehicle terminal except the vehicle terminal that sends the first information. The following describes the technical solutions of this application in detail with reference to the accompanying drawings.

Figure 3:
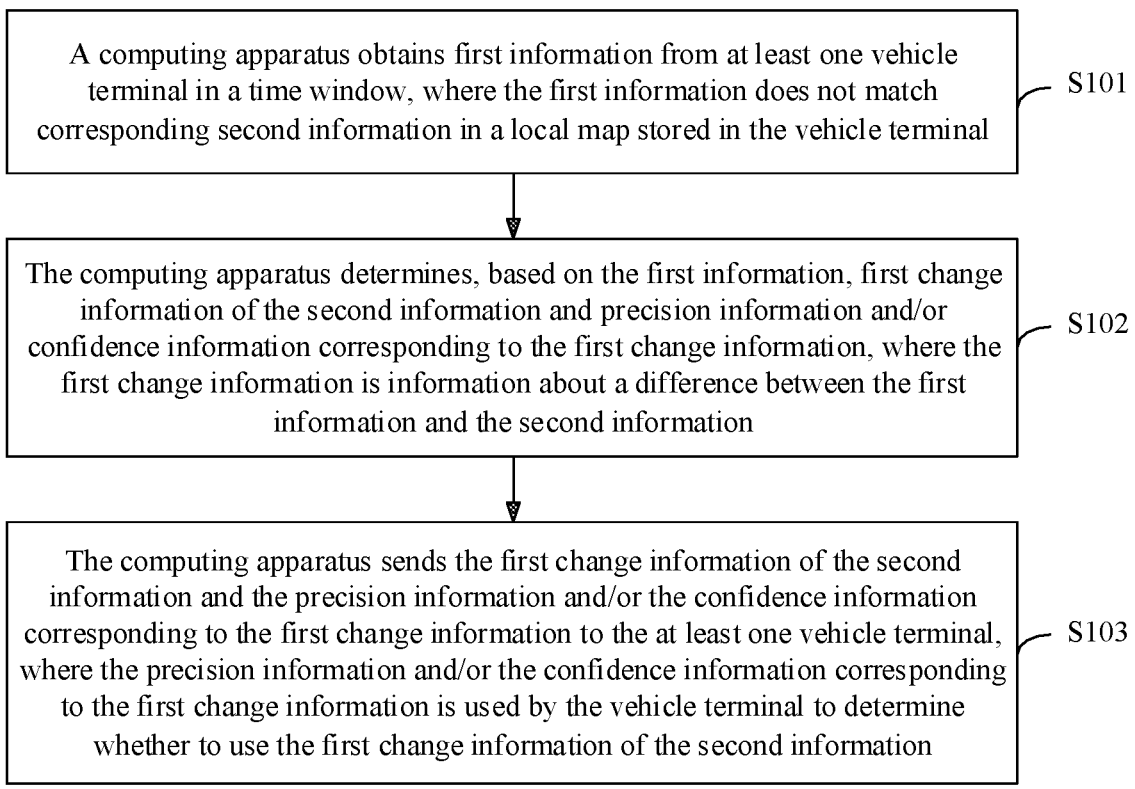
FIG. 3 is a flowchart of an embodiment of a map update data processing method according to this application.

FIG. 3 is a flowchart of an embodiment of a map update data processing method according to this application. As shown in FIG. 3, this embodiment may be executed by a computing apparatus. The computing apparatus may be a server, or may be an apparatus such as a processor disposed in the server. The method in this embodiment may include the following steps:

S101: The computing apparatus obtains first information from at least one vehicle terminal in a time window, where the first information does not match corresponding second information in a local map stored in the vehicle terminal.

The time window may be a preset time period, for example, may be one second, one minute, one hour, one day, one week, or half a month. The computing apparatus may periodically obtain the first information from the vehicle terminal by using the time window as a periodicity.

Specifically, the map in this application may be an electronic map. The electronic map is a digital map. The electronic map is a map that is stored, based on a map database, in a digital form by using a computer technology and that may be displayed on a display of a terminal device. A main component element of the electronic map is a map element, for example, a geographical element such as a mountain, a river system, a land, an administrative division, a point of interest, or a road, and for another example, a target element on a road such as a lane line, a crosswalk, a stop line, a traffic sign, a roadmap, a light pole, a traffic light, a gantry, a roundabout, or a parking lot. The road may be further divided into five classes: an expressway, a first-class road, a second class road, a third-class road, and a fourth-class road. Roads at each class may be different map elements.

The first information may be information detected by the vehicle terminal by sensing an ambient environment. For example, in a running process, the vehicle terminal obtains the first information by detecting the ambient environment through a sensor, such as a laser radar or a camera, disposed on the vehicle terminal. The first information may be one or more elements, for example, a roadmap, a light pole, a traffic signboard, or a traffic light. The first information may alternatively be attribute or feature information of an element, for example, road feature information. The road feature information may be, for example, a width, a shape, a curvature, a friction coefficient, or the like of a road. The first information may alternatively be newly detected information compared with the local map, that is, information that is not in the local map.

The sensor disposed on the vehicle terminal may be a sensor such as the camera, the laser radar, a millimeter wave radar, an ultrasonic wave, or a combined inertial navigation. The second information may be at least one map element or at least one attribute of the map element in the local map. The second information is, for example, the lamp pole, the traffic signboard, the traffic light, or the lane line. Alternatively, the second information is at least one map element group, at least one map tile, at least one region, or at least one country in the local map. Alternatively, the second information is at least one of a shape, a curvature, a slope, or a width of a road.

The vehicle terminal compares the detected first information with the corresponding second information in the local map, and if the detected first information does not match the corresponding second information, sends the detected first information to the computing apparatus. The nonmatching may be, for example, the following four cases:

1. If the second information is the at least one map element in the local map, the vehicle terminal compares the detected first information with the corresponding second information in the local map, and when a location of the second information (which is the at least one map element in the local map) changes, where the location is, for example, a lane line, a stop line, a zebra crossing area, an intersection area, or an external rectangular surface formed by a lamp pole and a lamp, the vehicle terminal determines that the first information does not match the second information.

2. If the second information is the at least one attribute of the map element in the local map, the vehicle terminal compares the detected first information with the corresponding second information in the local map, and when the second information (which is the at least one attribute of the map element in the local map) changes, for example, a color, a shape, a width, a material, a line type, whether a lane is a special-purpose lane, or a road curvature/slope topology changes, the vehicle terminal determines that the first information does not match the second information.

3. The vehicle terminal compares the detected first information with the corresponding second information in the local map, and when determining that the first information is a newly added map element, the vehicle terminal determines that the first information does not match the second information.

4. The vehicle terminal compares the detected first information with the corresponding second information in the local map, where the second information is an original map element, and when determining that the original map element disappears, the vehicle terminal determines that the first information does not match the second information.

S102: The computing apparatus determines, based on the first information, first change information of the second information and precision information and/or confidence information corresponding to the first change information, where the first change information is information about a difference between the first information and the second information.

Specifically, in the time window, the computing apparatus may receive one or more pieces of first information. The computing apparatus first determines the first change information of the second information based on the first information and the corresponding second information in the local map stored in the vehicle terminal. It should be noted that the local map stored in the vehicle terminal is sent by the computing apparatus to the vehicle terminal. Therefore, the computing apparatus knows the local map stored in the vehicle terminal and a corresponding version of the local map. The first change information is the information about the difference between the first information and the second information, or information indicating that the first information is inconsistent with the second information. For example, the vehicle terminal detects a first roadmap of a point A of a first intersection, where the first information is attribute information such as a location (namely, the point A of the first intersection), a color, a shape, and a size of the roadmap; searches, based on the first information, for the second information (namely, a map element herein) of a location corresponding to the location of the roadmap in the local map; and if the location has a second roadmap, determines information about a difference between attribute information of the first roadmap and the second roadmap, for example, a difference between a color, a shape, and a size, and determines the determined difference information as the first change information of the second information; or if the location in the local map does not have any information, determines that the first roadmap is a newly added roadmap, and may determine the attribute information such as the location, the shape, and the size of the first roadmap as the first change information of the second information.

The computing apparatus may further determine, based on the determined first change information, the precision information and/or the confidence information corresponding to the first change information. Specifically, the precision information and/or the confidence information may be used to represent reliability of map update data. Specifically, the computing apparatus determines, based on the determined first change information, the precision information corresponding to the first change information. The following provides three feasible example implementations:

Manner 1: The precision information corresponding to the first change information may be defined as a quantity of vehicle terminals that report the first information in the time window. In this case, the computing apparatus may determine, based on the quantity of vehicle terminals that report the first information in the time window, that the precision information corresponding to the first change information is the quantity of vehicle terminals that report the first information in the time window. For example, if the quantity of vehicle terminals that report the first information in the time window is 50, the precision information corresponding to the first change information is 50.

Manner 2: The precision information corresponding to the first change information may be defined as a ratio of a quantity of vehicle terminals that report the first information in the time window to a quantity of all vehicle terminals that pass through a geographical location corresponding to the second information in the time window. Specifically, the vehicle terminal may report a geographical location of the vehicle terminal to the computing apparatus, so that the computing apparatus may learn the quantity of vehicle terminals that pass through a geographical location. In this case, the computing apparatus may determine, based on the quantity of vehicle terminals that report the first information in the time window and the quantity of all vehicle terminals that pass through a geographical location corresponding to the second information in the time window, the precision information corresponding to the first change information. For example, if the quantity of vehicle terminals that report the first information in the time window is 50, and the quantity of all vehicle terminals that pass through a geographical location corresponding to the second information in the time window is 80, the precision information corresponding to the first change information is $5/8=0.625$.

Manner 3: The precision information corresponding to the first change information may be defined as error information of the first change information. In this case, the computing apparatus may determine, based on the error information of the first change information, the precision information corresponding to the first change information, where the error information is a measurement deviation value of the vehicle terminal. It should be understood that the measurement deviation value herein may also be quantized into a plurality of discrete levels. For example, when the update data is a location of an element, the precision information is deviation information or a deviation order of the location.

The confidence in this embodiment of this application may be a probability that an overall parameter value falls within an interval of a sample statistic value, and is also referred to as any one of a guarantee rate, reliability, a confidence level, or a confidence coefficient, that is, a form of a confidence level in conventional mathematics. Alternatively, the confidence may be a posterior probability for determining a detection target, for example, a posterior probability value based on Bayesian estimation or a value that is between 0 and 1 and that is obtained through calculation based on a membership function of fuzzy mathematics. This is not specifically limited in this embodiment.

Specifically, the precision information corresponding to the first change information may be used to measure accuracy and reliability of the first change information. The computing apparatus may be used to determine the precision information corresponding to the first change information, so as to determine the accuracy and reliability of the first change information. When sending the first change information to the vehicle terminal, the computing apparatus carries the precision information corresponding to the first change information, so that the vehicle terminal may learn the accuracy and reliability of the first change information, and may determine, based on the reliability, whether to use the map update data. This ensures security of using the first change information by the vehicle terminal.

According to this embodiment of this application, in a feasible implementation, the confidence information corresponding to the first change information may be a maximum value or a weighted average value of a confidence level of the first change information in the time window. Correspondingly, that the computing apparatus determines, based on the determined first change information, the confidence information corresponding to the first change information may be calculating the maximum value or the weighted average value of the confidence level of the first change information in the time window. The calculated maximum value or weighted average value of the confidence level of the first change information is the confidence information corresponding to the first change information.

In another feasible implementation, when a quantity of map elements corresponding to the second information is greater than 1, the confidence information corresponding to the first change information may be an average value of confidence levels of all map elements corresponding to the second information. Correspondingly, that the computing apparatus determines, based on the determined first change information, the confidence information corresponding to the first change information may be calculating the average value of confidence levels of all map elements corresponding to the second information. The calculated average value of confidence levels of all map elements corresponding to the second information is the confidence information corresponding to the first change information.

S103: The computing apparatus sends the first change information of the second information and the precision information and/or the confidence information corresponding to the first change information to the at least one vehicle terminal, where the precision information and/or the confidence information corresponding to the first change information is used by the vehicle terminal to determine whether to use the first change information of the second information.

Specifically, after the computing apparatus obtains the first change information of the second information and the precision information corresponding to the first change information, or the computing apparatus obtains the first change information of the second information and the confidence corresponding to the first change information, or the computing apparatus obtains the first change information of the second information and the precision information and/or the confidence information corresponding to the first change information, the computing apparatus sends the first change information of the second information and the precision information and/or the confidence information corresponding to the first change information to the at least one vehicle terminal. The vehicle terminal may determine, based on the first change information of the second information and the precision information and/or the confidence information corresponding to the first change information, whether to use the first change information of the second information. For example, if the vehicle terminal determines that the precision information and/or the confidence information corresponding to the first change information of the second information meets a preset requirement, the vehicle terminal determines to use the first change information, for example, navigation may be performed directly by using the first change information of the second information, or navigation may be performed after the local map is updated by using the first change information of the second information. It may be understood that the first change information of the second information may be referred to as the map update data. Because the map update data sent by the computing apparatus to the vehicle terminal carries the precision information and/or the confidence information, and the precision information and/or the confidence information may represent reliability of the map update data, the vehicle terminal may learn credibility of the map update data, and may further determine, based on the reliability, whether to use the map update data. This improves reliability of using the map update data sent to the vehicle terminal, and ensures security of using the map update data by the vehicle terminal.

Further, based on the foregoing embodiment, the method according to this embodiment may further include:

S104: The computing apparatus receives, from the at least one vehicle terminal, result feedback information obtained after the first change information is used.

S105: The computing apparatus determines second change information of the second information based on the result feedback information, where the second change information of the second information is data used to perform map update.

Specifically, the computing apparatus sends the first change information of the second information and the precision information and/or the confidence information corresponding to the first change information to the vehicle terminal, and the vehicle terminal determines, based on a configuration of the vehicle terminal, whether to use the first change information of the second information. If the vehicle terminal determines to use the first change information of the second information, after using, the vehicle terminal generates a corresponding use result in a running process. The use result is "correct" or "incorrect", or the use result is a score feedback, and feedback information is the use result. The vehicle terminal sends the result feedback information to the computing apparatus. The computing apparatus may determine the second change information of the second information based on the result feedback information. For example, if the result feedback information is "correct", the computing apparatus may determine that the second change information of the second information includes the first change information, or if the result feedback information is "incorrect", the computing apparatus may determine that the second change information of the second information does not include the first change information. The second change information of the second information may be data used to perform map update. The vehicle terminal may use the first change information of the second information to check accuracy of a map element in updated map information, and notify the computing apparatus of a check result. The computing apparatus may determine, based on the result feedback information, whether the second change information of the second information includes the first change information. This further improves accuracy and credibility of the map update data.

Optionally, the computing apparatus may perform map update based on the second change information of the second information. Because the second change information of the second information is verified by running of the vehicle terminal, accuracy can be ensured. Therefore, the computing apparatus may perform map update based on the second change information of the second information.

According to the map update data processing method provided in this embodiment, the computing apparatus is used to obtain the first information from the at least one vehicle terminal in the time window, where the first information does not match the corresponding second information in the local map stored in the vehicle terminal; then determines, based on the first information, the first change information of the second information and the precision information and/or the confidence information corresponding to the first change information; and finally sends the first change information of the second information and the precision information and/or the confidence information corresponding to the first change information to the at least one vehicle terminal. The vehicle terminal may determine, based on the first change information of the second information and the precision information and/or the confidence information corresponding to the first change information, whether to use the first change information of the second information. Because the map update data (that is, the first change information of the second information) sent by the computing apparatus to the vehicle terminal carries the precision information and/or the confidence information, and the precision information and/or the confidence information may represent reliability of the map update data, the vehicle terminal may learn credibility of the map update data, and may further determine, based on the reliability, whether to use the map update data. This improves reliability of using the map update data sent to the vehicle terminal, and ensures security of using the map update data by the vehicle terminal.

In this embodiment of this application, the computing apparatus may be a cloud server or a second device. When a transmission delay of the first information is greater than or equal to a preset threshold, that is, the first information is data with a relatively low delay requirement (or insensitive), the computing apparatus is the cloud server. In this case, that the computing apparatus obtains first information from at least one vehicle terminal in a time window in S101 may be specifically:

The computing apparatus receives the first information sent by the at least one vehicle terminal.

Alternatively, the computing apparatus receives the first information sent by the at least one vehicle terminal through a first device. The first device is, for example, a base station. Specifically, the vehicle terminal may send the first information to the base station, and the base station sends the first information to the cloud server for processing. Optionally, before the computing apparatus receives the first information sent by the at least one vehicle terminal through the first device, the method may further include: The computing apparatus sends, to the first device, information used to request the first information. To be specific, the vehicle terminal sends the first information to the first device, and the first device sends the first information to the computing apparatus only after receiving the information that is sent by the computing apparatus and that is used to request the first information.

When the transmission delay of the first information is less than the preset threshold, a to-be-processed time of the first information is relatively short, and the first information is data that needs to be processed immediately, for example, some data on which an accident may occur if the first information is not processed immediately. In this case, the computing apparatus is the second device, and that the computing apparatus obtains first information from at least one vehicle terminal in a time window in S101 may be specifically:

The computing apparatus receives the first information sent by the at least one vehicle terminal. Specifically, the vehicle terminal directly transmits the first information to the second device, and the second device performs S102 and S103. In this way, a transmission delay is relatively short, and an overall processing time can be shortened.

Optionally, the second device may be one of a base station, a roadside unit device, or another vehicle terminal except the at least one vehicle terminal.

According to this embodiment, in a feasible implementation, before the first information is sent by the vehicle terminal to the computing apparatus, the first information may be scrambled by using vehicle identification information, area identification information, or map element identification information. In this way, first information sent by different vehicle terminals can be distinguished, and accuracy of demodulation of received information from different vehicles can be improved.

Alternatively, before the first information is sent by the vehicle terminal to the computing apparatus, the first information is initialized by using vehicle identification information, area identification information, or map element identification information. In this way, first information sent by different vehicle terminals can be distinguished, and accuracy of demodulation of received information from different vehicles can be improved.

According to this embodiment, if the transmission delay of the first information is less than the preset threshold, the computing apparatus is the cloud server, and an amount of first information whose transmission delay is less than the preset threshold is less than or equal to an amount of first information whose transmission delay is greater than or equal to the preset threshold. In this way, complexity of data processing by the computing apparatus can be reduced.

The following uses a specific embodiment to describe a process in which the vehicle terminal reports the first information based on different transmission delays of the first information.

Figure 4:
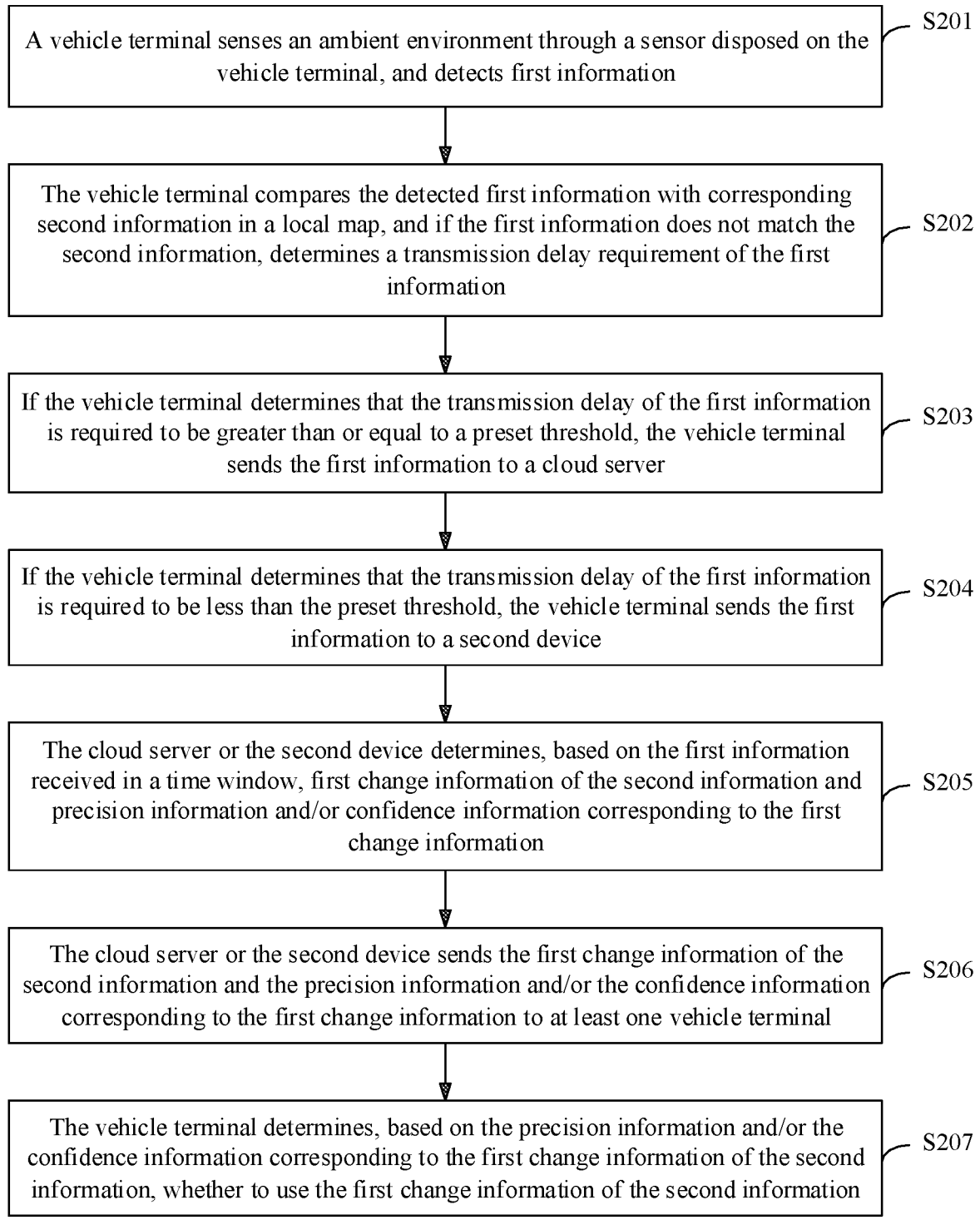
FIG. 4 is a flowchart of an embodiment of a map update data processing method according to this application.

FIG. 4 is a flowchart of an embodiment of a map update data processing method according to this application. As shown in FIG. 4, the method in this embodiment may include the following steps:

S201: A vehicle terminal senses an ambient environment through a sensor disposed on the vehicle terminal, and detects first information.

Specifically, for example, in a running process, the vehicle terminal obtains the first information by detecting the ambient environment through the sensor, such as a laser radar or a camera, disposed on the vehicle terminal. For a specific explanation of the first information, refer to the description in the embodiment in FIG. 3. Details are not described herein again.

S202: The vehicle terminal compares the detected first information with corresponding second information in a local map, and if the first information does not match the second information, determines a transmission delay of the first information.

That the first information does not match the second information may be, for example, the following four cases:

1. If the second information is at least one map element in the local map, the vehicle terminal compares the detected first information with the corresponding second information in the local map, and when a location of the second information (which is the at least one map element in the local map) changes, where the location is, for example, a lane line, a stop line, a zebra crossing area, an intersection area, or an external rectangular surface formed by a lamp pole and a lamp, the vehicle terminal determines that the first information does not match the second information.

2. If the second information is at least one attribute of the map element in the local map, the vehicle terminal compares the detected first information with the corresponding second information in the local map, and when the second information (which is the at least one attribute of the map element in the local map) changes, for example, a color, a shape, a width, a material, a line type, whether a lane is a special-purpose lane, or a road curvature/slope topology changes, the vehicle terminal determines that the first information does not match the second information.

3. The vehicle terminal compares the detected first information with the corresponding second information in the local map, and when determining that the first information is a newly added map element, the vehicle terminal determines that the first information does not match the second information.

4. The vehicle terminal compares the detected first information with the corresponding second information in the local map, where the second information is an original map element, and when determining that the original map element disappears, the vehicle terminal determines that the first information does not match the second information.

If it is determined that the first information does not match the second information, the transmission delay of the first information is further determined. That is, a type of the first information is determined, to determine whether the first information is data that needs to be processed immediately.

S203: If the vehicle terminal determines that the transmission delay of the first information is greater than or equal to a preset threshold, the vehicle terminal sends the first information to a cloud server.

Specifically, if the transmission delay of the first information is greater than or equal to the preset threshold, the first information is delay-insensitive data. In this case, the vehicle terminal sends the first information to the cloud server for processing.

Alternatively, the vehicle terminal sends the first information to the cloud server through a first device. The first device is, for example, a base station. Specifically, the vehicle terminal may send the first information to the base station, and the base station sends the first information to the cloud server for processing.

S204: If the vehicle terminal determines that the transmission delay of the first information is less than the preset threshold, the vehicle terminal sends the first information to a second device.

The second device may be one of a base station, a roadside unit device, or another vehicle terminal except at least one vehicle terminal. Specifically, if the transmission delay of the first information is less than the preset threshold, a to-be-processed time of the first information is relatively short, and the first information is data that needs to be processed immediately, for example, some data on which an accident may occur if the first information is not processed immediately. In this case, the vehicle terminal directly transmits a map element to the second device, and the second device processes the map element. In this way, a transmission delay is relatively short, and an overall processing time can be shortened.

S205: The cloud server or the second device determines, based on the first information received in a time window, first change information of the second information and precision information and/or confidence information corresponding to the first change information.

For a specific determining process, refer to the description of S102. Details are not described herein again.

S206: The cloud server or the second device sends the first change information of the second information and the precision information and/or the confidence information corresponding to the first change information to the at least one vehicle terminal.

S207: The vehicle terminal determines, based on the precision information and/or the confidence information corresponding to the first change information of the second information, whether to use the first change information of the second information.

According to the map update data processing method provided in this embodiment, when detecting the first information that does not match the corresponding second information in the local map, the vehicle terminal determines the transmission delay of the first information. If the transmission delay of the first information is greater than or equal to the preset threshold, the vehicle terminal sends the first information to the cloud server for processing or sends the first information to the cloud server for processing through the first device. If determining that the transmission delay of the first information is less than the preset threshold, the vehicle terminal sends the first information to the second device for processing. The second device may be one of the base station, the roadside unit device, or the another vehicle terminal except the at least one vehicle terminal. In this way, map update data that has a relatively high real-time requirement can be transmitted to the base station, the roadside unit device, or the vehicle terminal for processing immediately, and map update data that has a relatively low real-time requirement can be transmitted to the cloud server for processing. Such classification processing can improve efficiency of map update data processing.

The following uses a specific embodiment to describe in detail a technical solution of the method embodiments shown in FIG. 3 and FIG. 4.

Figure 5A:
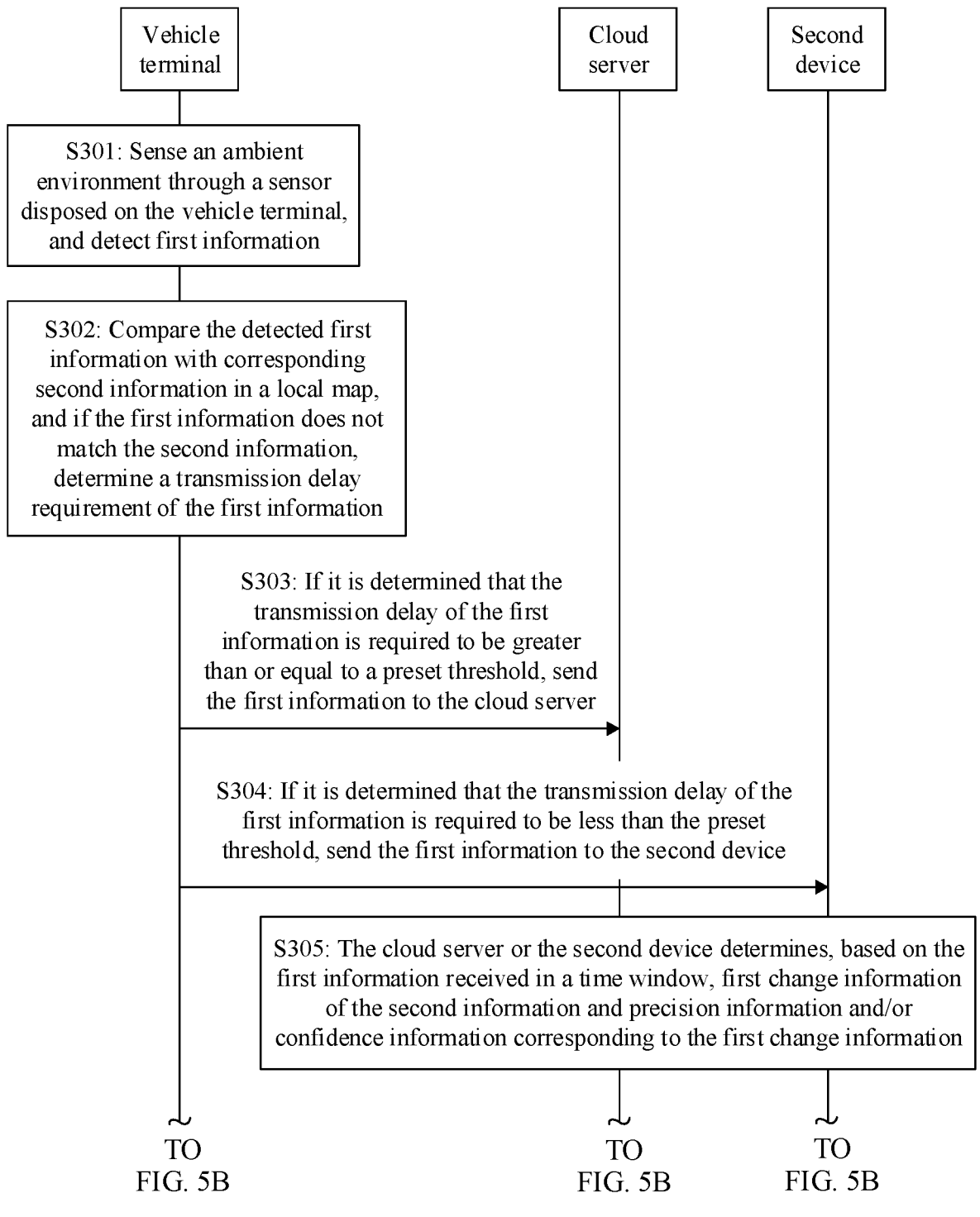
FIG. 5A and FIG. 5B are an interaction flowchart of an embodiment of a map update data processing method according to this application.
Figure 5B:
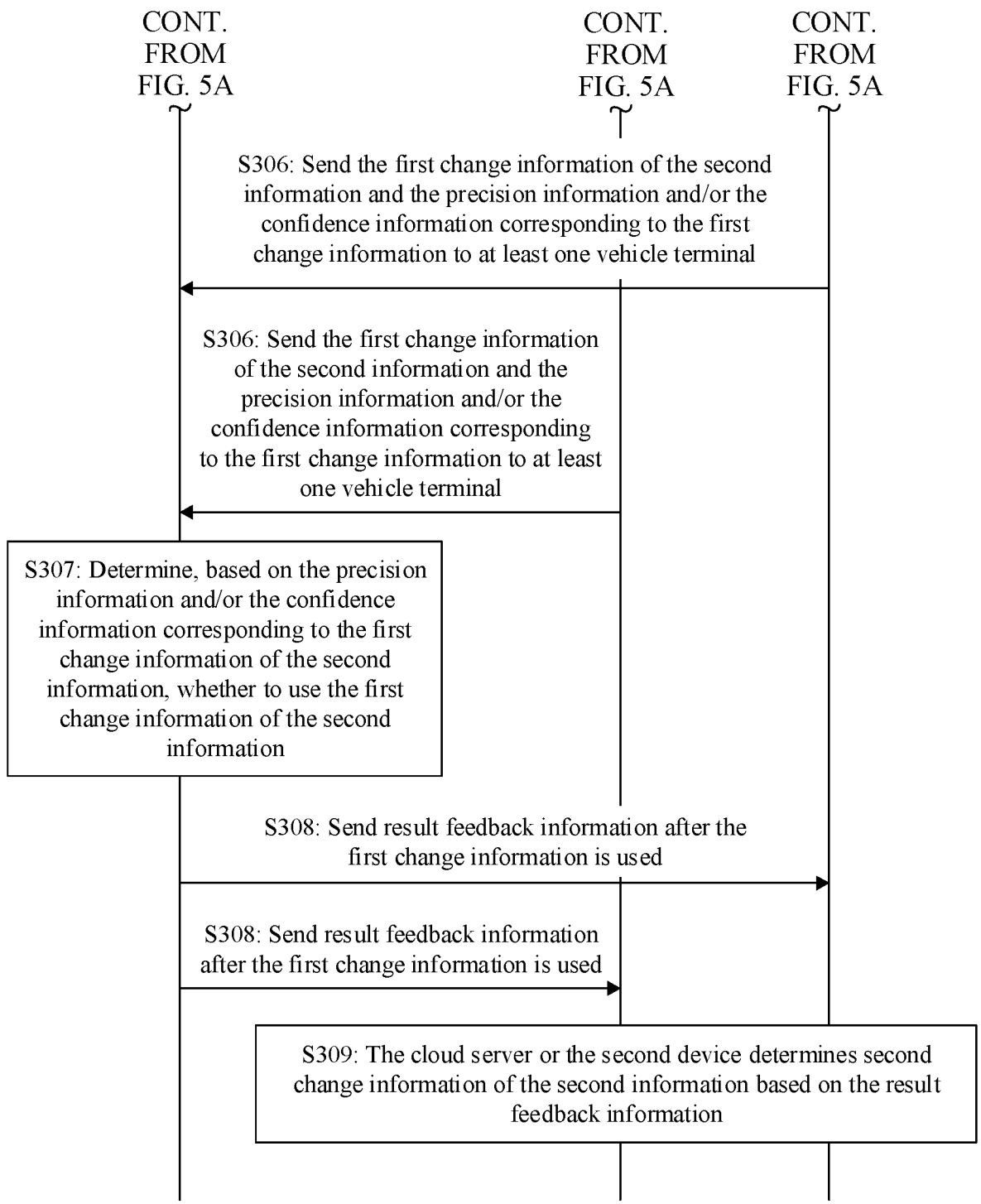

FIG. 5A and FIG. 5B are an interaction flowchart of an embodiment of a map update data processing method according to this application. As shown in FIG. 5A and FIG. 5B, the method in this embodiment may include the following steps:

S301: A vehicle terminal senses an ambient environment through a sensor disposed on the vehicle terminal, and detects first information.

Specifically, for example, in a running process, the vehicle terminal obtains the first information by detecting the ambient environment through the sensor, such as a laser radar or a camera, disposed on the vehicle terminal. For a specific explanation of the first information, refer to the description in the embodiment in FIG. 3. Details are not described herein again.

S302: The vehicle terminal compares the detected first information with corresponding second information in a local map, and if the first information does not match the second information, determines a transmission delay of the first information.

That the first information does not match the second information may be specifically four cases. For details, refer to the description of S101 in the embodiment shown in FIG. 3. Details are not described herein again. If it is determined that the first information does not match the second information, the transmission delay of the first information is further determined. That is, a type of the first information is determined, to determine whether the first information is data that needs to be processed immediately.

S303: If the vehicle terminal determines that the transmission delay of the first information is greater than or equal to a preset threshold, the vehicle terminal sends the first information to a cloud server.

Specifically, if the transmission delay of the first information is greater than or equal to the preset threshold, the first information is delay-insensitive data. In this case, the vehicle terminal sends the first information to the cloud server for processing.

Alternatively, the vehicle terminal sends the first information to the cloud server through a first device. The first device is, for example, a base station. Specifically, the vehicle terminal may send the first information to the base station, and the base station sends the first information to the cloud server for processing.

S304: If the vehicle terminal determines that the transmission delay of the first information is less than the preset threshold, the vehicle terminal sends the first information to a second device.

The second device may be one of a base station, a roadside unit device, or another vehicle terminal except at least one vehicle terminal. Specifically, if the transmission delay of the first information is less than the preset threshold, a to-be-processed time of the first information is relatively short, and the first information is data that needs to be processed immediately, for example, some data on which an accident may occur if the first information is not processed immediately. In this case, the vehicle terminal directly transmits a map element to the second device, and the second device processes the map element. In this way, a transmission delay is relatively short, and an overall processing time can be shortened.

S305: The cloud server or the second device determines, based on the first information received in a time window, first change information of the second information and precision information and/or confidence information corresponding to the first change information.

Specifically, there are a plurality of vehicle terminals, and each vehicle terminal reports detected first information to the cloud server or the second device. The cloud server or the second device determines, based on the first information received in the time window, the first change information of the second information and the precision information and/or the confidence information corresponding to the first change information. A time granularity of the time window may be, for example, a minute, an hour, a day, a week, or a month. For a specific determining process, refer to the description of S102. Details are not described herein again.

S306: The cloud server or the second device sends the first change information of the second information and the precision information and/or the confidence information corresponding to the first change information to the at least one vehicle terminal.

S307: The vehicle terminal determines, based on the precision information and/or the confidence information corresponding to the first change information of the second information, whether to use the first change information of the second information. If the vehicle terminal determines to use the first change information of the second information, continue to perform S308.

S308: The vehicle terminal sends, to the cloud server or the second device, result feedback information obtained after the first change information is used.

S309: The cloud server or the second device determines second change information of the second information based on the result feedback information, where the second change information of the second information is data used to perform map update.

Specifically, the vehicle terminal determines, based on a configuration of the vehicle terminal, whether to use the first change information of the second information. If the vehicle terminal determines to use the first change information of the second information, after using, the vehicle terminal generates a corresponding use result in a running process. The use result is "correct" or "incorrect", and feedback information is the use result. The cloud server is used as an example. The vehicle terminal sends the feedback information to the cloud server. The cloud server may determine the second change information of the second information based on the feedback information. For example, if the feedback information is "correct", the cloud server may determine that the second change information of the second information includes the first change information, or if the feedback information is "incorrect", the cloud server may determine that the second change information of the second information does not include the first change information. The second change information of the second information may be data used to perform map update. The vehicle terminal may use the first change information of the second information to check accuracy of a map element in updated map information, and notify the cloud server of a check result. The cloud server may determine, based on the result feedback information, whether the second change information of the second information includes the first change information. This further improves accuracy and credibility of the map update data.

Further, the cloud server or the second device may perform map update based on the second change information of the second information. Because the second change information of the second information is verified by running of the vehicle terminal, accuracy can be ensured. Therefore, the cloud server or the second device may perform map update based on the second change information of the second information.

Figure 6:
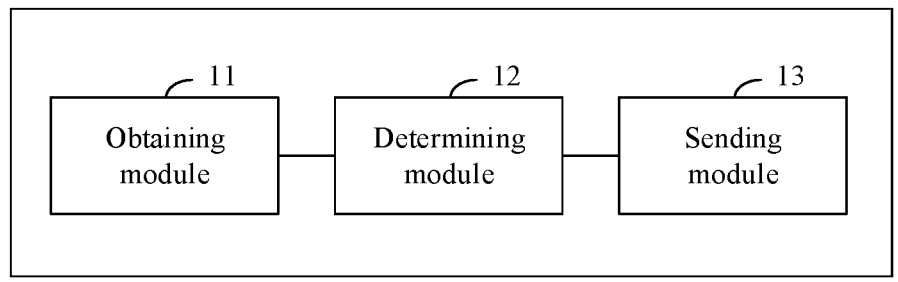
FIG. 6 is a schematic diagram of a structure of an embodiment of a map update data processing apparatus according to this application.

FIG. 6 is a schematic diagram of a structure of an embodiment of a map update data processing apparatus according to this application. As shown in FIG. 6, the apparatus in this embodiment may include: an obtaining module 11, a determining module 12, and a sending module 13.

The obtaining module 11 is configured to obtain first information from at least one vehicle terminal in a time window. The first information does not match corresponding second information in a local map stored in the vehicle terminal.

The determining module 12 is configured to determine, based on the first information, first change information of the second information and precision information and/or confidence information corresponding to the first change information. The first change information is information about a difference between the first information and the second information.

The sending module 13 is configured to send the first change information of the second information and the precision information and/or the confidence information corresponding to the first change information to the at least one vehicle terminal. The precision information and/or the confidence information corresponding to the first change information is used by the vehicle terminal to determine whether to use the first change information of the second information.

Optionally, the second information includes one or more of the following parameters:

at least one map element in the local map, at least one map element group in the local map, at least one map tile in the local map, at least one region in the local map, and at least one country in the local map.

The apparatus in this embodiment may be used to execute the technical solutions of the foregoing method embodiments. Implementation principles and technical effects thereof are similar. Details are not described herein again.

Figure 7:
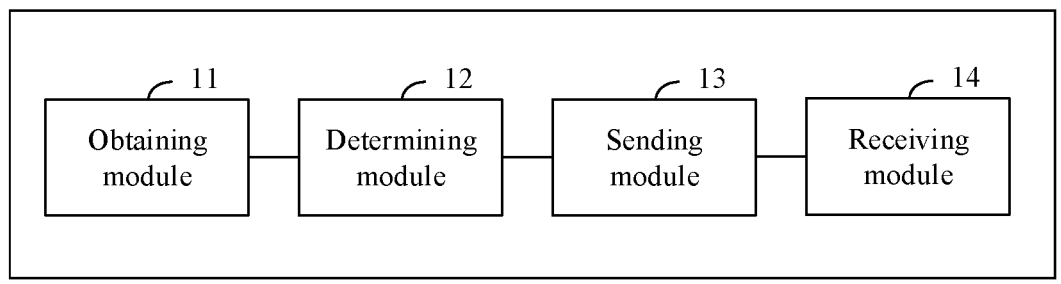
FIG. 7 is a schematic diagram of a structure of an embodiment of a map update data processing apparatus according to this application.

FIG. 7 is a schematic diagram of a structure of an embodiment of a map update data processing apparatus according to this application. As shown in FIG. 7, based on the apparatus shown in FIG. 6, the apparatus in this embodiment may further include a receiving module 14. The receiving module 14 is configured to receive, from the at least one vehicle terminal, result feedback information obtained after the first change information is used.

The determining module 12 is further configured to determine second change information of the second information based on the result feedback information. The second change information of the second information is data used to perform map update.

Optionally, the precision information corresponding to the first change information is a quantity of vehicle terminals that report the first information in the time window.

Alternatively, the precision information corresponding to the first change information is a ratio of a quantity of vehicle terminals that report the first information in the time window to a quantity of all vehicle terminals that pass through a geographical location corresponding to the second information in the time window.

Alternatively, the precision information corresponding to the first change information is error information of the first change information.

Optionally, the confidence information corresponding to the first change information is a maximum value or a weighted average value of a confidence level of the first change information in the time window.

Optionally, when a quantity of map elements corresponding to the second information is greater than 1, the confidence information corresponding to the first change information is an average value of confidence levels of all map elements corresponding to the second information.

Optionally, if a transmission delay of the first information is greater than or equal to a preset threshold, the apparatus in this embodiment includes a cloud server.

The obtaining module 11 is specifically configured to:
receive the first information sent by the at least one vehicle terminal; or
receive the first information sent by the at least one vehicle terminal through a first device.

Further, the sending module 13 is further configured to:
before the obtaining module 11 receives the first information sent by the at least one vehicle terminal through the first device, send, to the first device, information used to request the first information.

Optionally, if a transmission delay of the first information is less than a preset threshold, the apparatus in this embodiment includes a second device.

The obtaining module 11 is specifically configured to: receive the first information sent by the at least one vehicle terminal.

Optionally, the second device includes one of a base station, a roadside unit device, or another vehicle terminal except the at least one vehicle terminal.

Optionally, the first information is scrambled by using vehicle identification information, area identification information, or map element identification information.

Alternatively, the first information is initialized by using vehicle identification information, area identification information, or map element identification information.

Optionally, if a transmission delay of the first information is less than a preset threshold, the apparatus in this embodiment includes a cloud server, and an amount of first information whose transmission delay is less than the preset threshold is less than or equal to an amount of first information whose transmission delay is greater than or equal to the preset threshold.

The apparatus in this embodiment may be used to execute the technical solutions of the foregoing method embodiments. Implementation principles and technical effects thereof are similar. Details are not described herein again.

Figure 8:
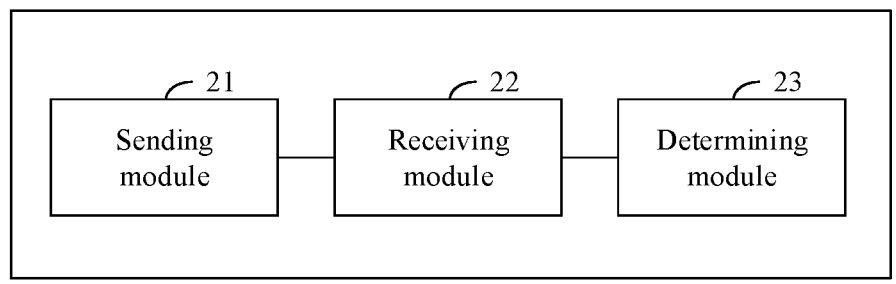
FIG. 8 is a schematic diagram of a structure of a vehicle terminal according to this application.

FIG. 8 is a schematic diagram of a structure of a vehicle terminal according to this application. As shown in FIG. 8, the vehicle terminal in this embodiment may include a sending module 21, a receiving module 22, and a determining module 23.

The sending module 21 is configured to send first information to a computing apparatus. The first information does not match corresponding second information in a local map stored in the vehicle terminal, and the first information is used by the computing apparatus to determine first change information of the second information and precision information and/or confidence information corresponding to the first change information. The first change information is information about a difference between the first information and the second information.

The receiving module 22 is configured to receive the first change information of the second information and the precision information and/or the confidence information corresponding to the first change information sent by the computing apparatus.

The determining module 23 is configured to determine, based on the precision information and/or the confidence information corresponding to the first change information, whether to use the first change information of the second information.

Further, the second information may include one or more of the following parameters:

at least one map element in the local map, at least one map element group in the local map, at least one map tile in the local map, at least one region in the local map, and at least one country in the local map.

Further, the sending module 21 is further configured to:

send, to the computing apparatus, result feedback information obtained after the first change information is used.

Further, the precision information corresponding to the first change information is a quantity of vehicle terminals that report the first information in a time window.

Alternatively, the precision information corresponding to the first change information is a ratio of a quantity of vehicle terminals that report the first information in a time window to a quantity of all vehicle terminals that pass through a geographical location corresponding to the second information in a time window.

Alternatively, the precision information corresponding to the first change information is error information of the first change information.

Further, the confidence information corresponding to the first change information is a maximum value or a weighted average value of a confidence level of the first change information in the time window.

Further, when a quantity of map elements corresponding to the second information is greater than 1, the confidence information corresponding to the first change information is an average value of confidence levels of all map elements corresponding to the second information.

Further, the first information is scrambled by using vehicle identification information, area identification information, or map element identification information.

Alternatively, the first information is initialized by using vehicle identification information, area identification information, or map element identification information.

The apparatus in this embodiment may be used to execute the technical solutions of the foregoing method embodiments. Implementation principles and technical effects thereof are similar. Details are not described herein again.

Figure 9:
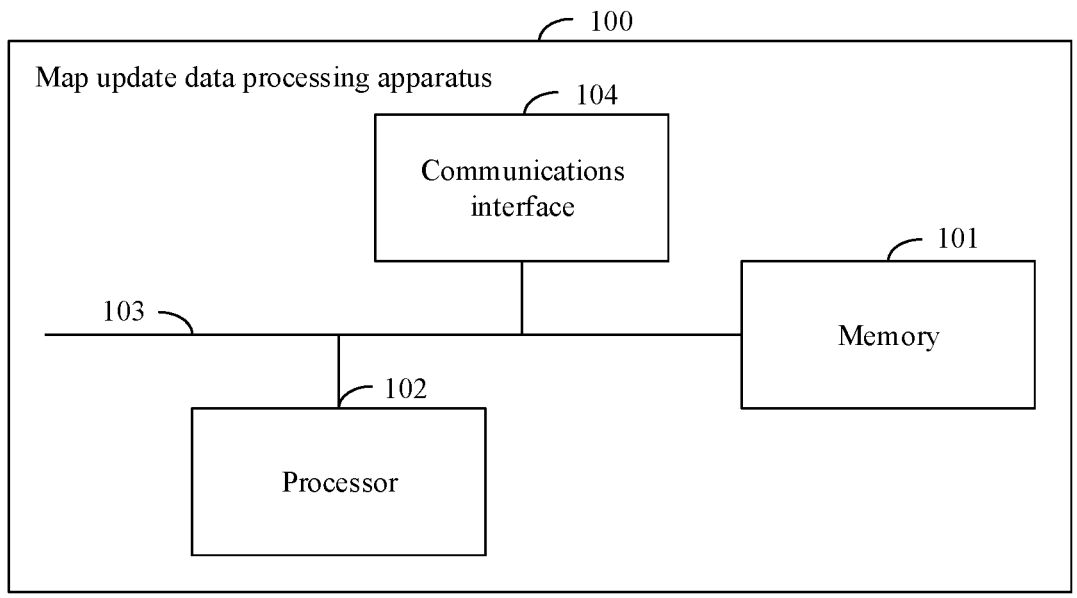
FIG. 9 is a schematic diagram of a structure of a map update data processing apparatus according to this application.

FIG. 9 is a schematic diagram of a structure of a map update data processing apparatus according to this application. The map update data processing apparatus 100 includes:

a memory 101 and a processor 102.

The memory 101 is configured to store computer programs.

The processor 102 is configured to execute the computer programs stored in the memory, to implement the map update data processing method in the foregoing embodiments. For details, refer to related descriptions in the foregoing method embodiments.

Optionally, the memory 101 may be independent, or may be integrated with the processor 102.

When the memory 101 is a component independent of the processor 102, the map update data processing apparatus 100 may further include:

a bus 103, configured to connect the memory 101 and the processor 102.

Optionally, this embodiment further includes a communications interface 104. The communications interface 104 may be connected to the processor 102 through the bus 103. The processor 102 may control the communications interface 104 to implement the foregoing receiving and sending functions of the map update data processing apparatus 100.

The apparatus may be configured to perform the steps and/or procedures corresponding to the server in the foregoing method embodiments.

Figure 10:
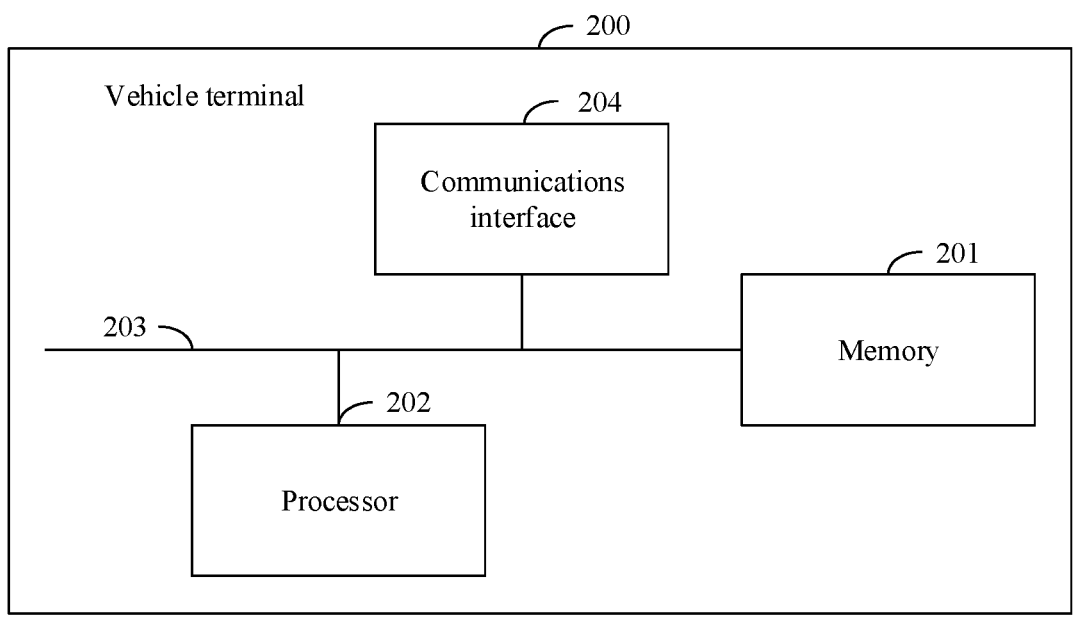
FIG. 10 is a schematic diagram of a structure of a vehicle terminal according to this application.

FIG. 10 is a schematic diagram of a structure of a vehicle terminal according to this application. The vehicle terminal 200 includes:

a memory 201 and a processor 202.

The memory 201 is configured to store computer programs.

The processor 202 is configured to execute the computer programs stored in the memory, to implement the map update data processing method in the foregoing embodiments. For details, refer to related descriptions in the foregoing method embodiments.

Optionally, the memory 201 may be independent, or may be integrated with the processor 202.

When the memory 201 is a component independent of the processor 202, the vehicle terminal 200 may further include:

a bus 203, configured to connect the memory 201 and the processor 202.

Optionally, this embodiment further includes a communications interface 204. The communications interface 204 may be connected to the processor 202 through the bus 203. The processor 202 may control the communications interface 204 to implement the foregoing receiving and sending functions of the vehicle terminal 200.

The apparatus may be configured to perform the steps and/or procedures corresponding to the server in the foregoing method embodiments.

This application further provides a readable storage medium. The readable storage medium stores execution instructions. When at least one processor of the map update data processing apparatus executes the execution instructions, the map update data processing apparatus performs the map update data processing method provided in the foregoing implementations.

This application further provides a readable storage medium. The readable storage medium stores execution instructions. When at least one processor of a vehicle terminal executes the execution instructions, the vehicle terminal performs the map update data processing method provided in the foregoing implementations.

This application further provides a program product. The program product includes execution instructions, and the execution instructions are stored in a readable storage medium. At least one processor of a map update data processing apparatus may read the execution instructions from the readable storage medium, and the at least one processor executes the execution instructions, so that the map update data processing apparatus implements the map update data processing method provided in the foregoing implementations.

A person of ordinary skill in the art may understand that all or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A map update data processing apparatus, comprising at least one processor and at least one memory, wherein the at least one memory stores program instructions, and the at least one processor is coupled to the at least one memory to execute the instructions to:
   obtain, first information from at least one vehicle terminal in a time window;
   determine, based on the first information and second information in a map, first change information and precision information and/or confidence information of the first change information, wherein the first change information indicates a difference between the first information and the second information; and
   send, the first change information and the precision information and/or the confidence information to a first vehicle terminal; and
   wherein the precision information is error information of the first change information, and the error information is a measurement deviation value of the at least one vehicle terminal which is quantized into a plurality of discrete levels.

2. The apparatus according to claim 1, wherein the second information comprises one or more of the following parameters:
   at least one map element in the map, at least one map element group in the map, at least one map tile in the map, at least one region in the map, and at least one country in the map.

3. The apparatus according to claim 1, wherein the at least one processor is coupled to the at least one memory to execute the instructions to:
   receive, from the first vehicle terminal, result feedback information obtained after the first change information is used by the first vehicle terminal; and
   determine, second change information for updating the map based on the result feedback information.

4. The apparatus according to claim 1, wherein the precision information is a quantity of the at least one vehicle terminal; or
   the precision information is a ratio of a quantity of the at least one vehicle terminal to a quantity of all vehicle terminals that pass through a geographical location corresponding to the second information in the time window.

5. The apparatus according to claim 1, wherein the confidence information is a maximum value or a weighted average value of a confidence level of the first change information.

6. The apparatus according to claim 1, wherein in response to a quantity of map elements corresponding to the second information being greater than 1, the confidence information corresponding to the first change information is an average value of confidence levels of all map elements corresponding to the second information.

7. The apparatus according to claim 1, wherein a transmission delay of the first information is greater than or equal to a preset threshold, the apparatus is a cloud server; and
   the at least one processor is coupled to the at least one memory to execute the instructions to:
   receive, the first information from the at least one vehicle terminal; or
   receive, the first information from the at least one vehicle terminal through a first device.

8. The apparatus according to claim 7, wherein the at least one processor is coupled to the at least one memory to execute the instructions to:
   send, information for requesting the first information to the first device.

9. The apparatus according to claim 1, wherein a transmission delay of the first information is less than a preset threshold, the apparatus is a second device, wherein the second device comprises one of a base station, a roadside unit device, or another vehicle terminal except the at least one vehicle terminal; and
   the at least one processor is coupled to the at least one memory to execute the instructions to:
   receive, the first information from the at least one vehicle terminal.

10. The apparatus according to claim 1, wherein the first information is scrambled by using vehicle identification information, area identification information, or map element identification information; or
    the first information is initialized by using the vehicle identification information, the area identification information, or the map element identification information.

11. The apparatus according to claim 1, wherein a transmission delay of the first information is less than a preset threshold, the apparatus is a cloud server, and
    wherein an amount of first information whose transmission delay is less than the preset threshold is less than or equal to an amount of first information whose transmission delay is greater than or equal to the preset threshold.

12. A map update data processing apparatus, comprising at least one processor and at least one memory, wherein the at least one memory stores program instructions, and the at least one processor is coupled to the at least one memory to execute the instructions to:

send, first information to a computing apparatus, wherein the first information does not match corresponding second information in a map stored in a vehicle terminal;

receive, a first change information and precision information and/or confidence information of the first change information from the computing apparatus, wherein the first change information indicates a difference between the first information and the second information;

wherein the precision information is error information of the first change information, and the error information is a measurement deviation value of the vehicle terminal which is quantized into a plurality of discrete levels; and determine, based on the precision information and/or the confidence information, whether to use the first change information for updating the map.

13. The apparatus according to claim 12, wherein the second information comprises one or more of the following parameters:

at least one map element in the map, at least one map element group in the map, at least one map tile in the map, at least one region in the map, and at least one country in the map.

14. The apparatus according to claim 12, wherein the at least one processor is coupled to the at least one memory to execute the instructions to:

send, result feedback information which is obtained after using the first change information, to the computing apparatus.

15. The apparatus according to claim 12, wherein the precision information is a quantity of vehicle terminals that report the first information in a time window; or the precision information is a ratio of the quantity of vehicle terminals that report the first information in the time window to a quantity of all vehicle terminals that pass through a geographical location corresponding to the second information in the time window.

16. The apparatus according to claim 12, wherein the confidence information is a maximum value or a weighted average value of a confidence level of the first change information in a time window.

17. The apparatus according to claim 12, wherein in response to a quantity of map elements corresponding to the second information being greater than 1, the confidence information is an average value of confidence levels of all map elements corresponding to the second information.

18. The apparatus according to claim 12, wherein the first information is scrambled by using vehicle identification information, area identification information, or map element identification information; or the first information is initialized by using the vehicle identification information, the area identification information, or the map element identification information.

19. The apparatus according to claim 12, wherein a transmission delay of the first information is greater than or equal to a preset threshold, and the computing apparatus is a cloud server.

20. The apparatus according to claim 12, wherein a transmission delay of the first information is less than a preset threshold, and the computing apparatus is a second device, wherein the second device comprises one of a base station, a roadside unit device, or another vehicle terminal except the at least one vehicle terminal.

* * * * *